3,486,340
GAS TURBINE POWERPLANT WITH MEANS FOR
COOLING COMPRESSED AIR
Anthony A. du Pont, Rolling Hills, and Edward N. Harris,
Palos Verdes Peninsula, Calif., and Thomas T. Schroeter, Tempe, Ariz., assignors to The Garrett Corporation,
Los Angeles, Calif., a corporation of California
Filed May 5, 1967, Ser. No. 636,344
Int. Cl. F02g 1/00; F02k 3/02
U.S. Cl. 60—262                    1 Claim

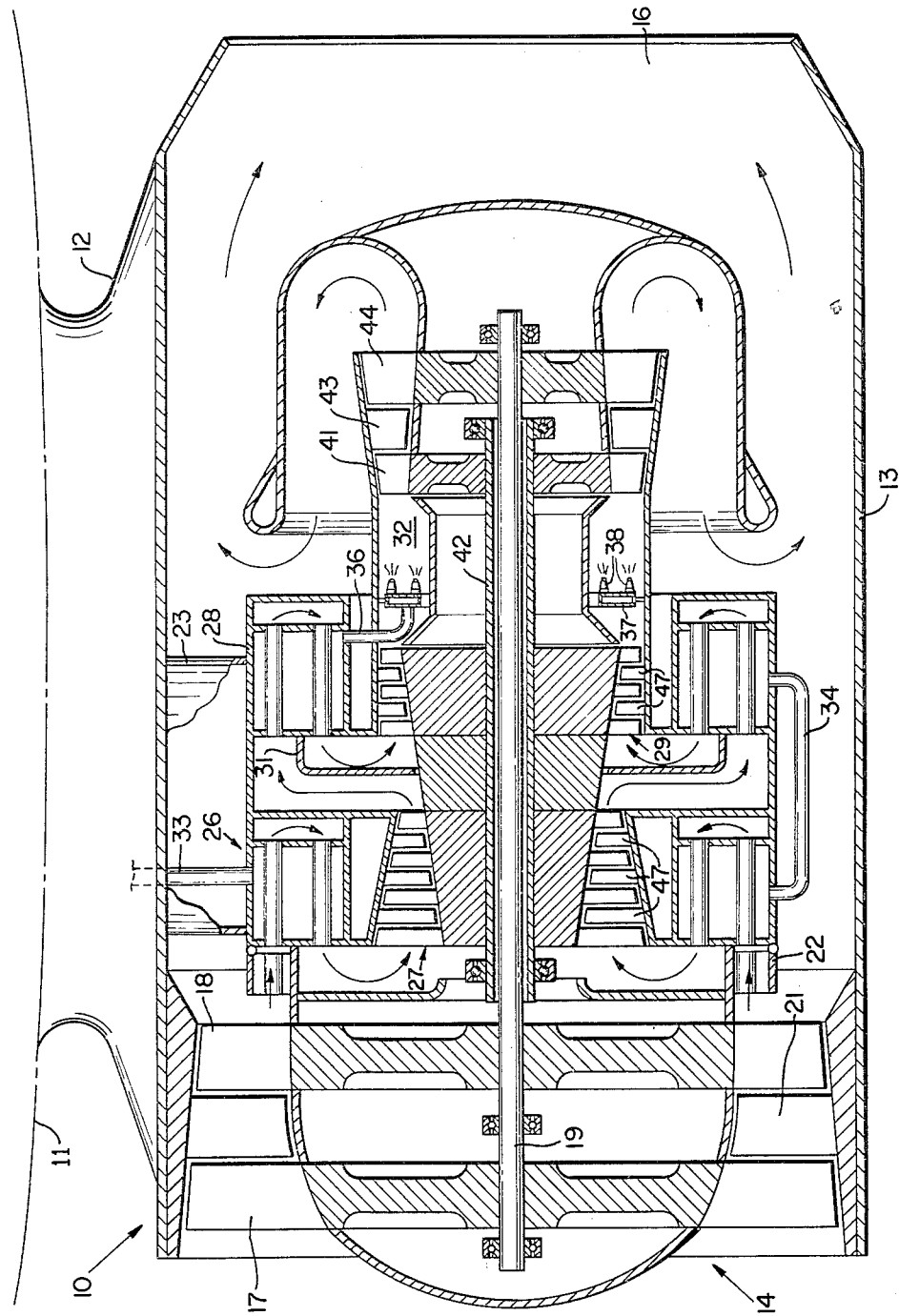

ABSTRACT OF THE DISCLOSURE

A bypass gas turbine powerplant having a multistage air compressor wherein interstage cooling is provided by cryogenic fuel. Flap means are provided between compressor stages to vary the air bypass ratio.

---

In general, a gas turbine power plant includes an air compressor for compressing the intake air before it is burnt with fuel so that work may be performed efficiently. It is well known that if air is compressed isothermally the amount of energy, required to compress the air, would be less than when the compression is adiabatic, without any extraction of heat.

The prior art suggested that in a turbine for a jet engine, the compressed air should be cooled with air in a bypass stream. Then, after combustion, the bypass air is mixed with the combustion products before they are jetted from a nozzle, thus the extracted heat from the high compressed air is reclaimed as thrust. This arrangement provides satisfactory efficient performance at relatively low or subsonic speeds. However, the forward speed of the jet engine is limited because the exit velocity of the mixed gases, i.e., the combustion products and the bypassed air, is lower than the exit velocity of the combustion products alone, discharging from the nozzle.

Therefore, an object of this invention is to provide a means for interstage cooling of the compressed gas without degrading the nozzle exit velocity of exhaust gases.

Another object is to provide a means for interstage cooling of the compressed gas with cryogenic fuels.

Basically, the invention comprises a gas turbine powerplant, preferably an aircraft jet engine, that uses cryogenic fuel, such as liquid hydrogen or liquid methane. The engine cycle includes the steps of compressing the intake air in an axial flow compressor, cooling the compressed air in an air-to-fuel heat exchanger to a temperature above the dew point to prevent icing problems, compressing the cooled air a second time, burning the air with the fuel. The hot combustion products power a turbine which drives the compressors, and then exhaust through a nozzle to provide thrust. When the engine is providing power to an aircraft travelling at subsonic velocity the combustion products could be mixed with bypass air to increase the efficiency and when the aircraft is travelling above sonic velocity, there would be no mixing of the combustion products with bypass air in order to maintain the nozzle velocity of the exhaust gas above the velocity of the aircraft.

Other objects, features and advantages of the invention are presented in the following description and claims, and illustrated in the accompanying drawings, in which the sole figure schematically shows a turbojet engine incorporating the features of this invention.

The figure shows a turbojet engine 10 in axial cross-section and attached to the fuselage of a suitable aircraft 11 by a strut member 12. The engine 10 has cylindrical housing 13 with an intake 14 and an exit nozzle 16 disposed at opposite ends. The engine 10 has suitable intake fans 17 and 18 mounted on a rotatable shaft 19. Between the fans 17 and 18 are disposed suitable stationary staging blades 21. The fans 17 and 18 draw air through the intaket 14 and move it toward the nozzle 15. After the air is discharged by the fan it is divided into two parts by a cylindrical partition 22 that is held coaxially with the housing 13 by suitable struts 23 disposed around the partition and only one of which is shown. Air passing through the space between the partition 22 and the housing 13 will be referred to as bypass or primary air, and the air entering the cylindrical partition 22 will be referred to as secondary air.

The secondary air is conducted to a fuel-to-air heat exchanger 26 and cooled to above the dew point, i.e., the freezing point of water, to avoid icing problems. The secondary air leaves that heat exchanger 26 and enters a first stage compressor 27 to be compressed again. The secondary air leaving the compressor 27 is guided radially outward and into another fuel-to-air heat exchanger 28. The air is cooled a second time before it enters a second stage compressor 29. A suitable baffle 31 is provided to keep the warm air separated by the cool air. The secondary air leaving the compressor 29 enters an annular combustion chamber 32 where it is burned with fuel.

The fuel is supplied to the chamber 32 through a pipe 33 that extends from a fuel tank (not shown) in the aircraft 11 through the strut member 12 and one of the struts 23. The pipe 33 communicates with the heat exchanger 26 so that the fuel enters the heat exchanger and absorbs heat from the air. The fuel leaves the exchanger 26 through a pipe 34. The pipe 34 communicates with the other heat exchanger and the fuel circulates there-through absorbing heat. The fuel leaves through a pipe 36 that communicates with a hollow ring 37. The ring 37 in turn has a plurality of suitable fuel torches 38. The hot gases, leaving the combustion chamber, exhaust through a first turbine wheel 41 causing a hollow shaft 42 to rotate. The first and second stage compressors are powered by shaft 42. The hot gases then pass through a stationary stator 43 and exhaust through a second turbine wheel 44, causing the shaft 19 to rotate. In turn, the fan blades 17 and 18 are rotated. The exhaust gases from the turbine are then mixed with the primary air and exhausted from the nozzle 16 to provide thrust.

The ratio of primary air and secondary air could be any value and still the fuel would provide sufficient cooling to the secondary air to cause nearly isothermal compression. The amount of cooling available for the secondary air in this invention is independent of the mass rate of the primary air. Thus suitable flaps are provided on the front end of the cylindrical partition 22 to vary the ratio of the mass rate of the primary air to the mass rate of the secondary air. Then when the aircraft is taking off the ratio could be made large to provide relatively low velocities and a high mass rate to the gases leaving the nozzle. When the aircraft is travelling at high speeds the ratio could be decreased as the aircraft speed increases to maintain the velocity of the gases leaving the nozzles above the speed of the aircraft. In this invention still more nearly isothermal compression could be obtained by cooling the stationary blades 47 in the compressors with fuel by suitable piping and ducting, not shown.

What is claimed is:
1. A turbojet engine comprising:
   intake means for intaking air into said engine,
   compressor means for compressing said air,
   a combustion chamber for burning said air with fuel to produce combustion gases,
   turbine means driven by said combustion gases to drive said compressor means,
   means for cooling said air with said fuel as said air is being compressed and before the fuel is burned in said chamber, said compressor means comprising an intake fan, a first-stage compressor and a second-stage compressor so that the air first passes through said fan, then is first compressed in said first stage and then in said second stage, means for dividing said air after passing through said intake means into a primary air stream and a secondary air stream, said means including flap means for varying the ratio of primary air to secondary air dependent on the speed of the craft being propelled by the turbojet engine, and means are provided for mixing said combustion gases with said primary air before being exhausted from said engine.

References Cited

UNITED STATES PATENTS

| 2,602,289 | 7/1952 | Anxionnaz | 60—267 |
| 2,563,744 | 8/1951 | Price | 60—261 |
| 3,016,698 | 1/1962 | Sobey | 60—262 |
| 3,107,690 | 10/1963 | Pope | 60—262 |

CARLTON R. CROYLE, Primary Examiner

DOUGLAS HART, Assistant Examiner

U.S. Cl. X.R.

60—39.66, 39.71, 267